(12) United States Patent
Endo (10) Patent No.: US 10,091,373 B2
(45) Date of Patent: Oct. 2, 2018

(54) IMAGE PROCESSING DEVICE HAVING REMOVAL FAILURE PREVENTION FEATURE

(71) Applicants: KABUSHIKI KAISHA TOSHIBA, Tokyo (JP); TOSHIBA TEC KABUSHIKI KAISHA, Tokyo (JP)

(72) Inventor: Katsuya Endo, Fuji Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/252,086

(22) Filed: Aug. 30, 2016

(65) Prior Publication Data

US 2017/0118362 A1    Apr. 27, 2017

(30) Foreign Application Priority Data

Oct. 26, 2015    (JP) .................. 2015-209748

(51) Int. Cl.
*H04N 1/00* (2006.01)
*H04N 1/028* (2006.01)
*H04N 1/10* (2006.01)
*H04N 1/193* (2006.01)

(52) U.S. Cl.
CPC ....... *H04N 1/00771* (2013.01); *H04N 1/0044* (2013.01); *H04N 1/00689* (2013.01); *H04N 1/00694* (2013.01); *H04N 1/00697* (2013.01); *H04N 1/00708* (2013.01); *H04N 1/00734* (2013.01); *H04N 1/0283* (2013.01); *H04N 1/1061* (2013.01); *H04N 1/193* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2006/0092453 | A1* | 5/2006 | Okada ................ | H04N 1/00411 358/1.14 |
| 2006/0132821 | A1* | 6/2006 | Nonaka ............. | H04N 1/00127 358/1.13 |
| 2010/0110494 | A1* | 5/2010 | Park ........................ | B41J 29/38 358/1.16 |
| 2012/0224203 | A1* | 9/2012 | Masuda ............. | H04N 1/00697 358/1.13 |

FOREIGN PATENT DOCUMENTS

JP    2008-245148    10/2008

* cited by examiner

*Primary Examiner* — Thomas D Lee
(74) *Attorney, Agent, or Firm* — Patterson & Sheridan, LLP (57) ABSTRACT

A document processing device includes a scanner, a display, a notification unit, and a control unit. The scanner is configured to read a document provided on a document table. The display is configured to display image data of the document read by the scanner. The notification unit is configured to provide a notification warning to indicate that the document has not been removed from the document table. The control unit is configured to detect the document on the document table.

20 Claims, 6 Drawing Sheets

IMAGE PROCESSING DEVICE HAVING REMOVAL FAILURE PREVENTION FEATURE

CROSS-REFERENCE TO RELATED APPLICATION

This application is based upon and claims the benefit of priority from Japanese Patent Application No. 2015-209748, filed on Oct. 26, 2015, the entire contents of which are incorporated herein by reference.

FIELD

Embodiments described herein generally relate to a document processing device and a data processing device.

BACKGROUND

A multi-functional peripheral (MFP) is a multi-functional processing device which may be used as a scanner, a printer, a facsimile device, and/or a data storage device. The MFP may be configured to notify a user by providing an audible warning so as to prevent the user from forgetting to retrieve printed materials once the printing operation has been completed. In one example, the MFP may also provide a notification warning to the user to prevent the user from forgetting to bring a document and/or proper materials before the printing operation.

However, in the aforementioned MFP, the user removes the document from the document table before confirming an image printed on the paper. Accordingly, the image printed on the paper may not be an image which is desired by the user. Such a situation is likely to occur in a case where the user inputs a setting with respect to copying. The situation may also occur in a case where a direction and/or tilt of the document is not proper, or in a case where multiple documents placed on the document table are copied to one sheet of paper. In this case, the user has to redo the input, such as mounting the document on the document table and/or inputting the settings with respect to copying.

DETAILED DESCRIPTION

Embodiments disclosed herein generally relate to a document processing device. The document processing device includes a scanner, a display, a notification unit, and a control unit. The scanner is configured to read a document provided on a document table. The display is configured to display image data of the document read by the scanner. The notification unit is configured to provide a notification warning to indicate that the document has not been removed from the document table. The control unit is configured to detect the document on the document table.

Hereinafter, all embodiments will be described with reference to accompanying drawings. Each figure is a schematic diagram of the embodiments for promoting an understanding of the embodiments. A shape, dimension, rate, or the like thereof may be different from that of an actual device, and layout thereof may be appropriately changed.

Figure 1:
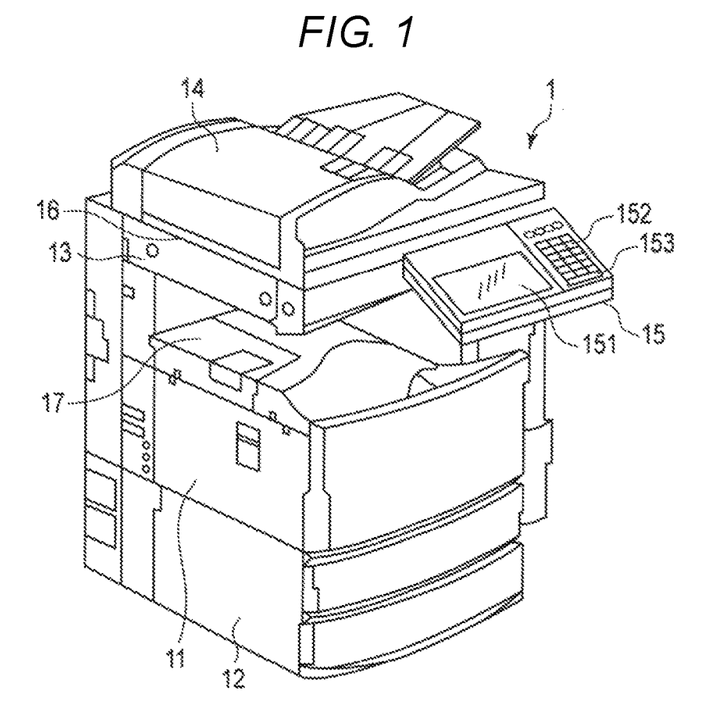
FIG. 1 is a schematic perspective view of an MFP, according to one embodiment described herein.

FIG. 1 is a perspective view illustrating a schematic shape of a multi-functional peripheral (MFP) 1. The MFP 1 is an example of a document processing device or a data processing device.

The MFP 1 includes a print unit 11, a paper tray 12, a scan unit 13, a feed unit 14, an operation panel 15, a document table 16, and a paper discharge tray 17.

The print unit 11 prints data on paper or other similar medium. The print unit 11 is a print processing unit, and includes a print mechanism of, for example, an electrophotographic method, an inkjet method, or the like. The print unit 11 may perform printing on a medium other than paper.

The paper tray 12 stores paper, and supplies the paper to the print unit 11.

The scan unit (or scanner) 13 reads the document which is placed on the document table 16, and takes in image data of the document. The scan unit 13 includes, for example, a light source which irradiates the document, a mirror which refracts or guides the light reflected by the document, a charge coupled device (CCD) image sensor which receives the reflected light, a carriage which moves the light source, the mirror, or the CCD image sensor mounted therein, and the like. The document includes a medium, such as a bankbook or a license.

The feed unit 14 includes a roller or the like, and supplies multiple documents to a read position of the scan unit 13 one by one.

The operation panel 15 includes a display unit 151, an input unit 152, and a connection portion 153.

The display unit 151 is a display which displays various types of information. In certain embodiments, the display unit 151 is a display device.

The input unit 152 includes multiple pressing type switches to which a user inputs set data with respect to processing of the MFP 1. In some embodiments, the input unit 152 is an input means. The input unit 152 may be a touch panel which is integral with the display unit 151, instead of the multiple pressing type switches. The input unit 152 may include a touch panel together with the multiple pressing type switches. All the switches included in the input unit 152 are further described infra.

The connection portion 153 is a slot through which recording media are connected to each other. The connection portion 153 is a connection means or a connection unit. Data stored in the recording media can be read by the MFP 1. The recording media may include, for example, a universal serial bus (USB) memory, and/or an SD memory Card®, but may include others.

The document table 16 is a table on which documents are mounted. A configuration of the document table 16 will be described below.

The paper discharge tray 17 is located in the outside of a housing of the MFP 1. The paper discharge tray 17 receives printed paper and/or printed material (hereinafter, referred to as printed material) and contains the printed paper.

Figure 2:
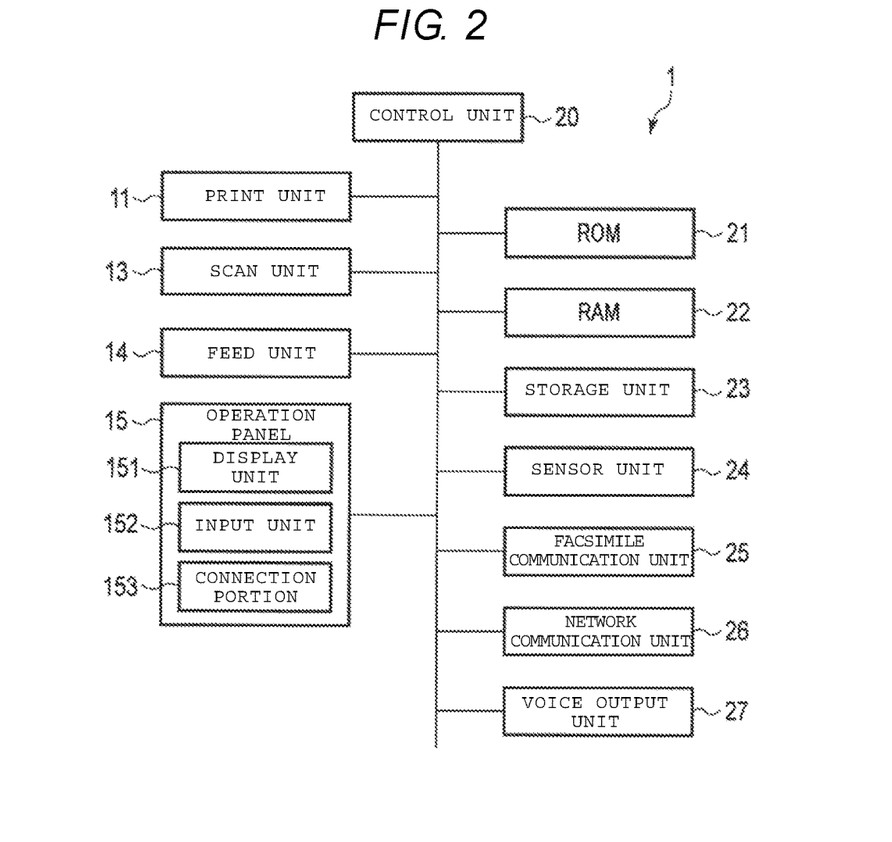
FIG. 2 is a schematic block diagram of a control system of the MFP, according to one embodiment described herein.

FIG. 2 is a schematic block diagram illustrating a configuration of a control system of the MFP 1.

The MFP 1 includes a control unit 20, a read only memory (ROM) 21, a random access memory (RAM) 22, a storage unit 23, a sensor unit 24, a facsimile communication unit 25, a network communication unit 26, and a voice output unit 27. Each unit of the MFP 1 is operatively connected to each other through a system bus.

The control unit 20 is a controller including a central processing unit (CPU) that controls each unit of the MFP 1.

The ROM 21 stores various control programs which are required for operating the MFP 1.

The RAM 22 is a buffer memory that temporarily stores data which is generated when the control program is executed.

The storage unit 23 is a nonvolatile memory medium. The storage unit 23 is, for example, a hard disk drive (HDD).

The sensor unit 24 includes multiple sensors arranged in each unit of the MFP 1. The sensor unit 24 further includes multiple sensors which detect presence or absence of the document on the document table 16. The sensor unit 24 also includes a sensor which detects presence or absence of the printed material on the paper discharge tray 17.

The facsimile communication unit 25 is an interface which transmits or receives facsimile data. The facsimile communication unit 25 is a facsimile processing unit.

The network communication unit 26 is an interface for transmitting or receiving data to or from an external device other than the MFP 1 through a network.

The voice output unit 27 is a speaker which outputs a voice. The voice output unit 27 is one example of a notification unit. Another example of the notification unit is the display unit 151.

Figure 3:
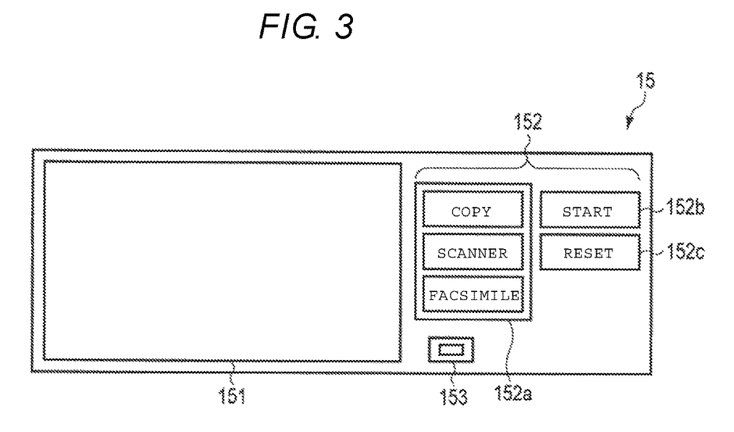
FIG. 3 is a schematic plan view of an operation panel, according to one embodiment described herein.

FIG. 3 is a schematic plan view of the operation panel 15. The operation panel 15 includes the display unit 151, the input unit 152, and the connection portion 153, as described above.

The input unit 152 is an input device that includes a function switch 152a, such as a copy switch, a scanner switch, and a facsimile switch. The copy switch selects start-up of copying of the MFP 1. The scanner switch selects start-up of scanner processing of the MFP 1. During scanner processing, image data of the document taken in by, for example, the scan unit 13 is stored in the storage unit 23. The facsimile switch selects start-up of facsimile switch of the MFP 1.

The input unit 152 also includes a start switch 152b and a reset switch 152c. The start switch 152b selects a start of the processing, based on the function selected by the function switch 152a. The start switch 152b is also an OK switch for authenticating a current state. The reset switch 152c is an NG switch for denying the current state.

The input unit 152 also includes a switch for inputting a setting with respect to the processing of the data, such as image quality or magnification.

Figure 4:
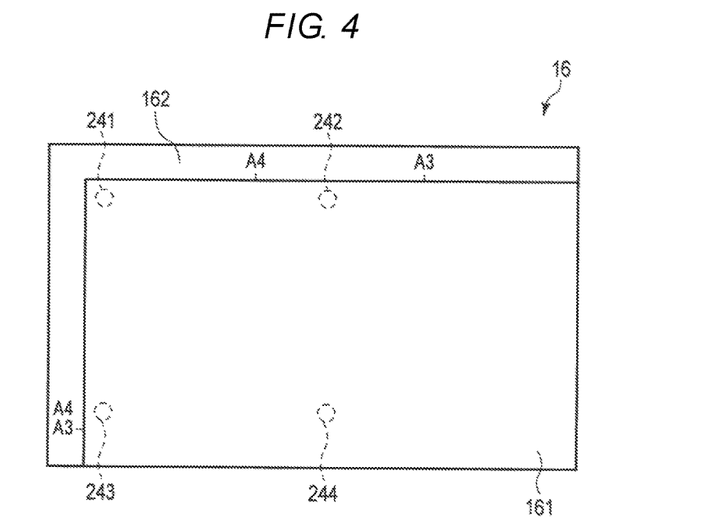
FIG. 4 is a schematic plan view of a document table, according to one embodiment described herein.

FIG. 4 is a schematic plan view of the document table 16. The document table 16 includes a glass plate 161 and a guide 162.

The glass plate 161 is a transparent flat plate of a rectangular shape on which the document is place.

The guide 162 is disposed at an end portion of the glass plate 161 so as to define a position of the document. The guide 162 has a mark with a size of the document at each of two sides orthogonal to each other. The guide 162 includes marks of, for example, A3 and A4. A user can place the document on the document table 16 in accordance with the guide 162.

The sensor unit includes a first sensor 241, a second sensor 242, a third sensor 243, and a fourth sensor 244. The first sensor 241, the second sensor 242, the third sensor 243, and the fourth sensor 244 are each disposed at positions different from each other and on a surface side opposite to a surface of the glass plate 161 on which the document is placed. For example, the sensors 241, 242, 243, 244 are disposed such that each sensor 241, 242, 243, 244 faces a periphery of a corner of the document, byway of example only, when the document has an A3 size as placed along the guide 162. The first sensor 241 and the third sensor 243 are each disposed to face the periphery of the corner of the document, even in a case where the document of size A4 is placed along the guide 162. In one embodiment, the sensors 241, 242, 243, 244 are optical sensors which detect presence or absence of the document. The first sensor 241 outputs signals different from each other, in a case of detecting the presence of the document and in a case of detecting absence of the document. The second sensor 242, the third sensor 243, and the fourth sensor 244 are the same as each other.

The following is an example which determines whether or not the document is placed along the guide 162.

First, determining whether or not the document of size A3 is placed along the guide 162 will be described. In a case where all the sensors 241 to 244 detect the presence of the document, the control unit 20 determines that the document of size A3 is placed along the guide 162. In a case where any one of the sensors 241 to 244 detects the absence of the document and the other three sensors detect the presence of the document, the control unit 20 determines that the document of size A3 is not placed along the guide 162.

Subsequently, an example of determining whether or not a document of size A4 is placed along the guide 162 will be described. In a case where the first sensor 241 and the third sensor 243 detect the presence of the document and the second sensor 242 and the fourth sensor 244 detect the absence of the document, the control unit 20 determines that the document of size A4 is placed along the guide 162. In a case where one of the first sensor 241 and the third sensor 243 detects the presence of the document and another sensor detects the absence of the document, the control unit 20 determines that the document of size A4 is not placed along the guide 162.

The sensor unit 24 includes five or more sensors, which detect the presence and/or the absence of the document. Furthermore, the control unit 20 can determine whether or not a document other than the document with a size of A3 or A4 is placed along the guide 162 in the same manner as in the above description.

Subsequently, an operation mode set in the MFP 1 having the aforementioned configuration will be described. The MFP 1 is set to an operation mode which may include at least one of a first operation mode and/or a second operation mode.

The first operation mode is set in an environment in which the MFP 1 is commonly utilized; for example, an office.

The second operation mode is also set in an environment in which the MFP 1 is commonly utilized; for example, a convenience store or a self-copy shop. In the environment of the second operation mode, a user often forgets to bring the necessary documents.

The first operation mode of the MFP 1 may be utilized in an environment which is used by many unspecified persons.

The second operation mode of the MFP 1 may be utilized in an environment which is used by many specified persons.

Subsequently, copying of the MFP 1 will be described.

Figure 5:
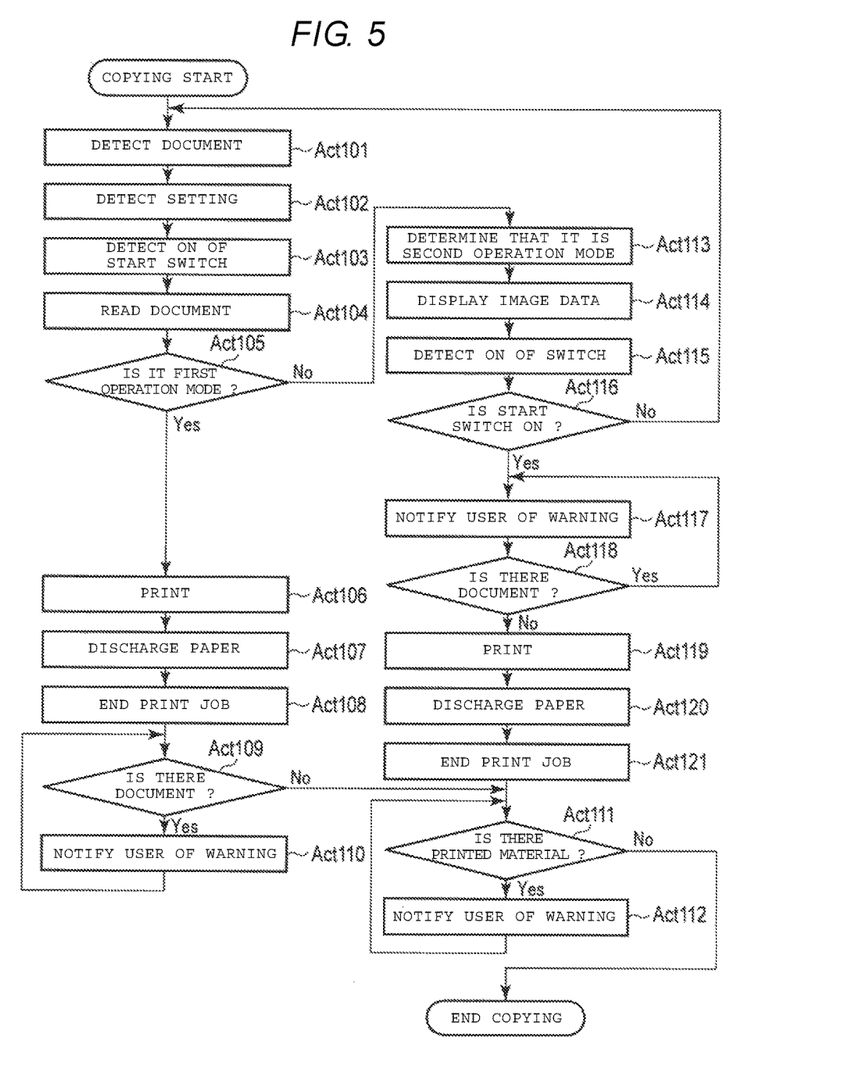
FIG. 5 is a flowchart schematically illustrating a copying sequence of the MFP, according to one embodiment described herein.

FIG. 5 is a schematic flowchart illustrating an example of copying via the MFP 1.

The control unit 20 performs control operations such that any document which is placed on the document table 16 is detected (Act 101). At Act 101, the control unit 20 determines a size and a position of the document which is placed on the document table 16, based on an output of the sensor unit 24.

The control unit 20 detects a copy setting for the document (Act 102). The copy setting includes setting of an image quality (concentration, black-and-white copy, or the like), a setting for copy magnification, a setting for paper output size, a setting for the copying of special paper sizes, e.g., a license or the like, among others. Each of the above copy settings are examples only, and other copy settings may be included. The copy setting can be changed from a default setting by an input to the input unit 152.

The control unit 20 detects an ON position of the start switch 152*b* (Act 103). The ON position of the start switch 152*b* corresponds to an input for causing the scan unit 13 to read the document.

The control unit 20 performs control operations such that the scan unit 13 reads the document (Act 104). At Act 104, the scan unit 13 reads the document which is placed on the document table 16 and takes image data in.

The control unit 20 determines whether or not the first operation mode of the MFP 1 is active (Act 105).

In an embodiment where the first operation mode is active (e.g. See, "Yes" at Act 104), the control unit 20 performs a control operation such that the print unit 11 prints the image data on the paper (Act 106). At Act 106, the print unit 11 prints the image data on the paper, according to the setting which is detected by the control unit 20 at Act 102.

The control unit 20 performs a control operation such that the printed material is discharged into the paper discharge tray 17 (Act 107).

The control unit 20 ends a print job at Act 108.

The control unit 20 determines whether or not the document is disposed on the document table 16, based on an output of the sensor unit 24 (Act 109).

In an embodiment where the document is on the document table 16 (e.g. See, "Yes" at Act 109), the control unit 20 performs a control operation such that a warning is made (Act 110). In some embodiments, the warning is a message indicating that the document has not been removed from the document table 16. The warning may prevent loss of the document caused by user carelessness. At Act 110, the display unit 151 notifies the user of warning through a video. The voice output unit 27 notifies the user of warning through a voice. In some embodiments, the voice output unit 27 may output a buzzer sound as the warning. The control unit 20 performs control operation such that the warning is continuously made until the document is removed from the document table 16.

In a case where the document is not on the document table 16 (e.g., "No" at Act 109), the control unit 20 detects whether or not the printed material is placed in the paper discharge tray 17, based on the output of the sensor unit 24 (Act 111).

In a case where the printed material is in the paper discharge tray 17 (e.g., "Yes" in Act 111), the control unit 20 performs a control operation such that a warning is made (Act 112). The warning is a message indicating that the printed material has not been removed from the paper discharge tray 17. The warning may prevent the loss of the printed material caused by the user carelessness. At least one of the display unit 151 and the voice output unit 27 notifies the user via a warning in the same manner as in Act 110. The control unit 20 performs a control operation such that the warning is continuously made until the document is removed from the paper discharge tray 17.

In a case where the printed material is not in the paper discharge tray 17 (e.g., "No" at Act 111), the control unit 20 ends copying.

After returning to Act 105, in a case where the MFP 1 is not set to the first operation mode (e.g., "No" at Act 105), the control unit 20 determines that the MFP 1 is set to the second operation mode (Act 113).

The control unit 20 performs a control operation such that image data is displayed on the display unit 151 (Act 114). At Act 114, the display unit 151 displays the image data of the document which is read by the scan unit 13. At this time, the display unit 151 displays the image data, according to the setting with respect to the copy of the document which is detected by the control unit 20 in Act 102.

The control unit 20 detects an ON position of any one switch of the start switch 152*b* and the reset switch 152*c* (Act 115). The ON position of the start switch 152*b* corresponds to an input of authentication of the image data in a case where the user determines that there is no problem in the image data. The ON position of the reset switch 152*c* corresponds to an input of non-authentication of the image data in a case where the user determines that there is a problem in the image data.

The control unit 20 determines whether or not the ON position of the start switch 152*b* is detected (Act 116). In a case where the ON position of the start switch 152*b* is detected (e.g., "Yes" at Act 116), the control unit 20 performs a control operation such that a warning is made in the same manner as in Act 110, described above (Act 117). At Act 117, at least one of the display unit 151 and the voice output unit 27 notifies the user via a warning, according to an input of the authentication of the image data.

The control unit 20 determines whether or not the document is on the document table 16, based on the output of the sensor unit 24 (Act 118).

In a case where the document is on the document table 16 (e.g., "Yes" at Act 118), the control unit 20 performs the processing of Act 117 again. That is, the control unit 20 performs the control operation such that the warning is continuously made until the document is removed from the document table 16.

In a case where the document does not remain on the document table 16 (e.g., "No" at Act 118), the control unit 20 performs a control operation such that the image data is printed on the paper by the print unit 11 in the same manner as in Act 106, described above, (Act 119).

The control unit 20 performs a control operation such that the printed material is discharged into the paper discharge tray 17 (Act 120).

The control unit 20 ends a print job (Act 121). Thereafter, the control unit 20 performs processing of Act 111 and Act 112, described above, and ends the copying.

After returning to Act 116, in a case where the ON position of the start switch 152*b* is not detected (e.g., "No" at Act 116), the control unit 20 performs the processing of Act 101 again. In a case where the ON position of the start switch 152*b* is not detected, there is a case where the ON position of the reset switch 152*c* is detected. That is, each time when the reset switch 152c is pressed, the control unit 20 repeats the reading of the document using the scan unit 13.

When referring to the description of the flowchart illustrated in FIG. 5 and described above, an operation of the first operation mode is as follows. The control unit 20 performs a control operation such that the image data of the document which is read by the scan unit 13 is printed on the paper by the print unit 11 without displaying on the display unit 151. Furthermore, at least one of the display unit 151 and the voice output unit 27 notifies the user via a warning indicating that the document has not been removed from the document table 16, after the image data is printed on the paper by the print unit 11.

If referring to the description of the flowchart illustrated in FIG. 5 and described above, an operation of the second operation mode is as follows. The display unit 151 displays the image data of the document which is read by the scan unit 13, before the image data is printed on the paper by the print unit 11. The control unit 20 requires an input of authentication or non-authentication of the image data, before the image data is printed on the paper by the print unit 11. At least one of the display unit 151 and the voice output unit 27 notifies the user via a warning which indicates that the document has been removed from the document table 16, according to an input of the authentication of the image data. The print unit 11 prints the image data on the paper, according to the fact that there is no document on the document table 16.

In the first operation mode, the user may obtain the printed material without confirmation of the image data and without removing the document. Accordingly, the user can efficiently copy multiple documents.

Meanwhile, in the second operation mode, the user needs to input the authentication of the image data before the printed material is obtained. Accordingly, the user can adjust a position (including tilt, direction, and the like) of the document on the document table 16, until the image data is in a desirable state. The user can input the setting with respect to the copying again, until the image data enters the desirable state. Furthermore, the user may remove the document before the printed material is obtained. As such, the user does not lose the document.

FIGS. 6A to 6D each exemplify a screen view of the second operation mode.

Figure 6A:
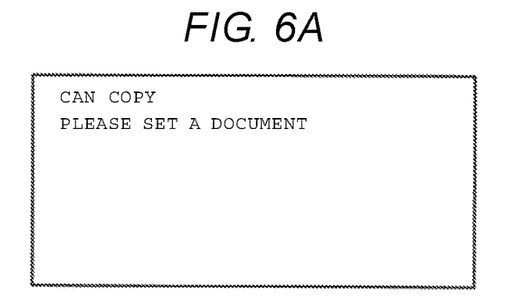
FIGS. 6A to 6D are each schematic screen views, according to one embodiment described herein.

FIG. 6A schematically illustrates a screen which is displayed by the display unit 151 before the processing of Act 101 is performed as described above. The display unit 151 displays a message indicating that the display unit can copy and a message which urges setting of the document.

Figure 6B:
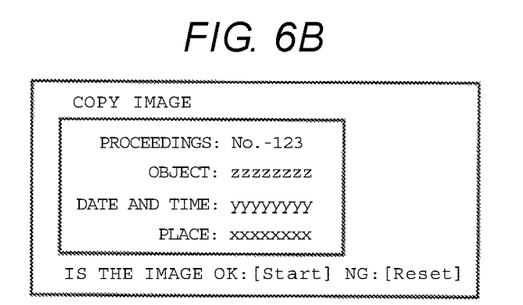

FIG. 6B schematically illustrates a screen which is displayed by the display unit 151 at Act 114, as described above. The display unit 151 displays the image data. Furthermore, the display unit 151 displays a message which urges pressing of the start switch 152b or the reset switch 152c as determination of the authentication (OK) or non-authentication (NG) of the image data.

Figure 6C:
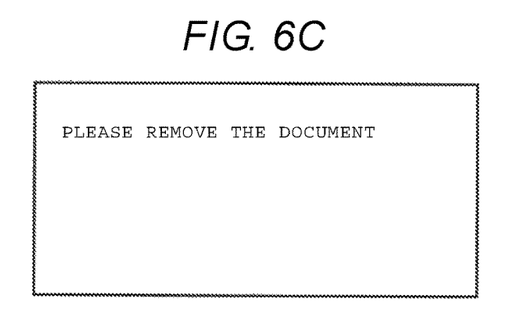

FIG. 6C schematically illustrates a screen which is displayed by the display unit 151 at Act 117, described above. The display unit 151 displays a warning indicating that the document has been removed.

Figure 6D:
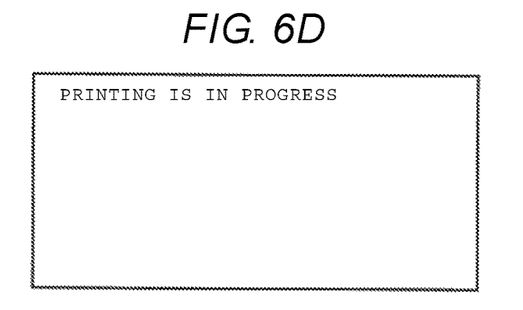

FIG. 6D schematically illustrates a screen which is displayed by the display unit 151 at Act 119. The display unit 151 displays a message indicating that printing is in progress, after the document is removed from the document table 16.

According to the first embodiment, the MFP 1 can be set to any one of the first operation mode and/or the second operation mode, according to the setting environment. Furthermore, the MFP 1 may prevent a user from frequently forgetting to bring the document in the convenience store, and can reduce redoing of the input relating to the copying.

Next, various modified examples of the first embodiment will be described.

In a modified example, the MFP 1 may also perform the same processing as the aforementioned copying, for various functions of the MFP 1, such as scanner processing and facsimile processing.

In an embodiment including scanner processing, the flowchart illustrated in FIG. 5 is different from the copying in the following points. The control unit 20 performs the scanner processing of the image data as follows, instead of Act 106 to Act 108. The control unit 20 is a processing unit for the scanner processing. The control unit 20 converts the image data of the document which is read by the scan unit 13 into a predetermined format at Act 104. The predetermined format is, for example, a PDF. Thereafter, the control unit 20 performs a control operation such that the image data is stored in the storage unit 23. The control unit 20 may perform the control operation such that the image data of the document is stored in an external device through the network communication unit 26. The control unit 20 performs the scanner processing of the image data, according to the fact that there is no document on the document table 16, instead of Act 119 to Act 121. The control unit 20 omits the processing Act 111 and Act 112.

In an embodiment including facsimile processing, the flowchart illustrated in FIG. 5 is different from the copying in the following points. The control unit 20 controls the facsimile processing of the image data which is performed by the facsimile communication unit 25 as follows, instead of Act 106 to Act 108. The control unit 20 performs a control operation such that the image data of the document which is read by the scan unit 13 in Act 104 is transmitted through the facsimile communication unit 25. The control unit 20 controls the facsimile processing of the image data which is performed by the facsimile communication unit 25, according to the fact that there is no document on the document table 16, instead of Act 119 to Act 121. The control unit 20 omits the processing of Act 111 and Act 112.

According to this example, the MFP 1 can prevent a user from forgetting to bring the document, and can reduce redoing of the input relating to the scanner processing, the facsimile processing, and the like.

In another modified example, the MFP 1 may perform a print job of data stored in a storage medium in the same manner as the aforementioned copying. In this case, the flowchart illustrated in FIG. 5 is different from the copying in the following points. The control unit 20 determines whether or not the storage medium is connected to the connection portion 153 in Act 101 and Act 109. At Act 104, the control unit 20 reads the data from the storage medium. At Act 114, the control unit 20 performs a control operation such that the data which is read from the storage medium is displayed on the display unit 151. At Act 118, the control unit 20 determines whether or not the storage medium is connected to the connection portion 153.

In a case where the storage medium is connected to the connection portion 153, the control unit 20 performs a control operation such that a warning is produced to indicate that the storage medium has not been removed from the connection portion 153 as made in Act 110 and Act 117. Thus, at least one of the display unit 151 and/or the voice output unit 27 notifies the user of the warning. The control unit 20 performs a control operation such that the warning is continuously made until the storage medium is removed from the connection portion 153.

At Act 119, the control unit 20 performs a control operation such that data is printed on the paper by the print unit 11, according to the fact that the storage medium is not connected to the connection portion 153.

The MFP 1 can also perform the scanner processing and the facsimile processing of the data stored in the storage medium in the same manner as described above.

According to this example, the MFP 1 can prevent a user from forgetting to remove the storage medium, and can reduce redoing of the input relating to the processing which is performed by the MFP 1.

Still another modification example, the MFP 1 may perform print processing of Act 119 before the warning is provided at Act 117. For example, the control unit 20 performs a control operation such that transportation of the printed material is temporarily stopped in the MFP 1 and the printed material is not discharged into the paper discharge tray 17. In another example, the MFP 1 may temporarily store the printed material in a stocker so as to temporarily evacuate the printed material which is provided in the inside thereof. The control unit 20 performs control such that the printed material is discharged into the paper discharge tray 17 after the sensor unit 24 does not detect the document at Act 118. The MFP 1 can also perform a print job of the data which is stored in the storage medium in the same manner as described above.

Accordingly, the user may not obtain the printed material before the document or the storage medium is removed. According to this example, the MFP 1 can prevent a user from forgetting to bring the document or the storage medium, and can reduce redoing of the input relating to the print processing which is performed by the MFP 1.

In certain embodiments, the control unit 20 can omits Act 114 to Act 116 of FIG. 5, according to a setting with respect to the processing of data or a state of a document which is placed on the document table 16. Various examples will be described herein.

In one embodiment, the control unit 20 performs the processing of Act 114 to Act 116, in a case where a setting with respect to the processing of image data is inputted. That is, the control unit 20 performs a control operation such that a warning is made at Act 117 after the image data is displayed on the display unit 151 at Act 114. Meanwhile, the control unit 20 omits the processing of Act 114 to Act 116, in a case where the setting with respect to processing of the image data is not inputted. That is, in a case where the setting is not changed by the input with respect to default setting, the control unit 20 performs the control operation such that the warning is made at Act 117 without displaying the image data on the display unit 151.

In some embodiments, the setting with respect to the processing of the image data is inputted. As such, a difference between the document and an image of the printed material is large. For example, concentration of the document is different from concentration of the image of the printed material. A paper size of the document is different from a paper size of the printed material. The image of the printed material is an enlarged copy or a reduced copy of the document. For this reason, the image of the printed material may not be desired by the user. When the user is not able to confirm the image data, there is a high possibility that the user fails copying. Hence, the control unit 20 performs the processing of Act 114 to Act 116.

Meanwhile, in some embodiments, the setting with respect to the processing of the image data is not inputted, and the difference between the document and the image of the printed material is small. For example, the concentration of the document is the same as the concentration of the image of the printed material. The paper size of the document is the same as the paper size of the printed material. The image of the printed material is a copy with the same size as the document. Even though the user is not able to confirm the image data, there is a small possibility that the user fails copying. Hence, the control unit 20 omits the processing of Act 114 to Act 116.

The control unit 20 can also perform the processing for the data which is stored in the storage medium in the same manner as described above.

In another embodiment, the control unit 20 performs the processing of Act 114 to Act 116, in a case where the document is not placed along the guide 162. That is, the control unit 20 performs a control operation such that a warning is made in Act 117 after the image data is displayed on the display unit 151 in Act 114. Meanwhile, the control unit 20 omits the processing of Act 114 to Act 116, in a case where the document is placed along the guide 162. That is, the control unit 20 performs a control operation such that the warning is made in Act 117 without displaying the image data on the display unit 151.

In a case where the document is not placed along the guide 162, a difference between the document and the printed material is large. For example, there is a possibility that a part of the documents is not provided to the image of the printed material. For this reason, the image of the printed material may not be the image which is desired by the user. When the user is not able to confirm the image data, there is a high possibility that the user fails copying. Hence, the control unit 20 performs the processing of Act 114 to Act 116.

Meanwhile, in a case where the document is placed along the guide 162, the difference between the document and the printed material is small. Even though the user is not able to confirm the image data, there is a small possibility that the user fails copying. Hence, the control unit 20 may omit the processing of Act 114 to Act 116.

In some embodiments, multiple documents may be placed along the guide 162. As such, the processing of Act 114 to Act 116 is performed. That is, the control unit 20 performs a control operation such that a warning is made at Act 117 after the image data is displayed on the display unit 151 at Act 114. Meanwhile, the control unit 20 omits the processing of Act 114 to Act 116, in a case where one document is placed along the guide 162. That is, the control unit 20 performs the control operation such that the warning is made at Act 117 without displaying the image data on the display unit 151.

In another embodiment, multiple documents may be placed along the guide 162. As such, the difference between the document and the printed material is large. For example, there is a possibility that the documents overlap to each other and a part of the documents is not provided to the image of the printed material. There is a possibility that arrangement of a sequence, a direction, or the like of the multiple documents is incorrectly made. For this reason, the image of the printed material may not be desired by the user. If the user is not able to confirm the image data, there is a high possibility that the user fails copying. Hence, the control unit 20 performs the processing of Act 114 to Act 116.

Meanwhile, in another embodiment in which one document is placed along the guide the guide 162, the difference between the document and the printed material is small. Even though the user is not able to confirm the image data, there is a small possibility that the user fails copying. Hence, the control unit 20 may omit the processing of Act 114 to Act 116.

The control unit 20 determines whether one document is placed along the guide 162 or multiple documents are placed along the guide 162, for example, as follows.

Figure 7:
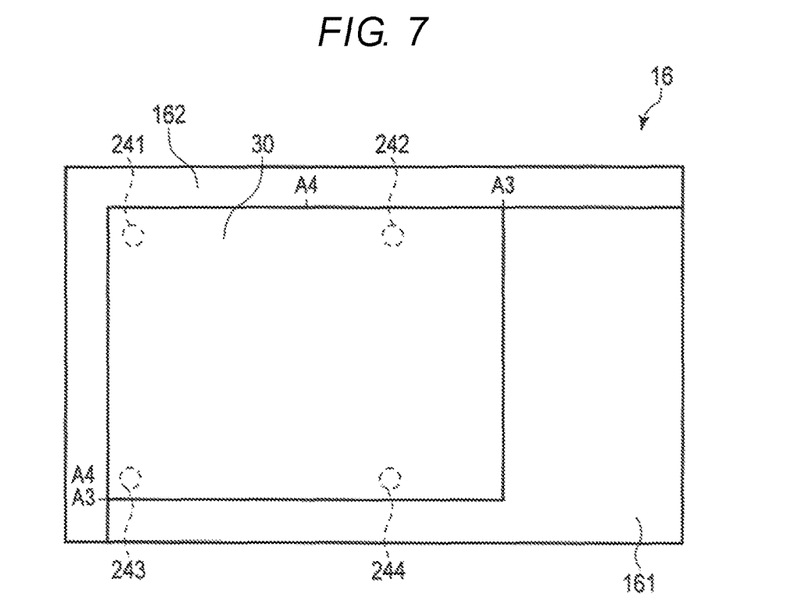
FIG. 7 is a schematic plan view of a document on a document table, according to one embodiment described herein.
Figure 8:
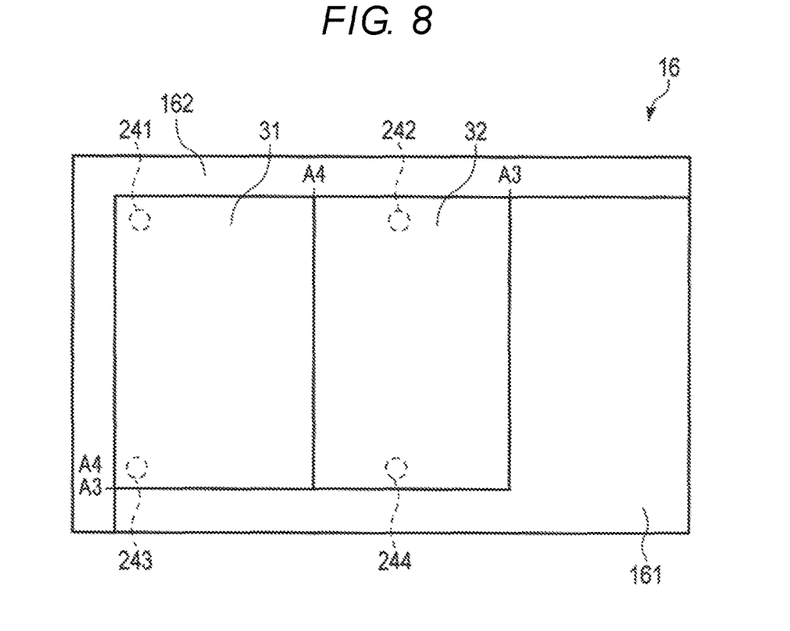
FIG. 8 is a schematic plan view of the document on the document table of FIG. 7, according to one embodiment described herein.

In one example, the control unit 20 determines the number of documents which are placed on the document table 16, based on output of each of the first sensor 241 and the second sensor 242. FIG. 7 and FIG. 8 are each schematic plan views illustrating the document on the document table 16 for describing the example. FIG. 7 illustrates a state in which one document 30 of size A3 is placed on the document table 16. FIG. 8 illustrates a state in which a document 31 of size A4 and a document 32 of size A4 are placed on the document table 16. The size of document 31 and document 32 are approximately the same as a size of document 30, size A3.

The control unit 20 detects a time difference between timing when the first sensor 241 detects presence of the document and timing when the second sensor 242 detects presence of the document. When the time difference is less than a predetermined reference time, the control unit 20 determines that the document 30 is placed on the document table 16. Meanwhile, when the time difference is equal to or more than the reference time, the control unit 20 determines that the document 31 and the document 32 are placed on the document table 16. The reason the control unit 20 can determine the presence of the document in this way, is that the time when the user places one document on the document table 16 is less than the time when the user places two documents side by side on the document table 16. In the same manner as described above, the control unit 20 may determine the number of documents which are placed on the document table 16, based on the detection timing of each of the first sensor 241 and the fourth sensor 244. The control unit 20 may determine the number of documents which are placed on the document table 16, based on the detection timing of each of the second sensor 242 and the third sensor 243. The control unit 20 may determine the number of documents which are placed on the document table 16, based on the detection timing of each of the third sensor 243 and the fourth sensor 244.

In another example, the control unit 20 determines the number of documents which are placed on the document table 16, based on the image data which is read by the scan unit 13. In a case where multiple documents are placed on the document table 16, there can be a black shadow (streak) in an interval between the documents or in a portion where the documents overlap each other. The control unit 20 determines that one document is placed on the document table 16, in a case of determining that there is no black shadow in the document data. Meanwhile, the control unit 20 determines that multiple documents are placed on the document table 16, in a case of determining the black shadow in the document data.

According to the some embodiments, the MFP 1 may omit the process of displaying the image data on the display unit 151, in a case where possibility that the user redoes input is low. Accordingly, the user can omit the operation of inputting authentication or non-authentication of the image data which is displayed on the display unit 151.

Benefits of the present disclosure generally include that the document processing device and/or the data processing device prevent a user from forgetting to bring a document and/or a storage medium. Additional benefits include a reduction in overall time and cost as less redoing of input is needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document processing device comprising:
a scanner configured to read a document on a document table and provide image data of the document;
a display configured to display the image data of the document;
an input unit configured to receive an authentication input from a user confirming acceptance of the image data;
a sensor unit configured to detect the document on the document table;
a print unit configured to print the image data of the document on a sheet; and
a control unit connected to the scanner, the display, the input unit, the sensor unit, and the print unit, and configured to:
cause the print unit to print the image data on the sheet, and
cause a notification unit to provide a notification warning indicating that the document remains on the document table, wherein
in a first operation mode, the control unit causes the print unit to print the image data on the sheet without receiving the authentication input, and
in a second operation mode, the control unit causes:
the image data to be displayed on the display before the notification warning is made, if an instruction not to display the image data from the user is not received,
the image data not be displayed on the display before the notification warning is made, if the instruction not to display the image data from the user is received, and
the notification unit to provide the notification warning after the authentication input has been received, and then the control unit causes the print unit to print the image data on the sheet.

2. The document processing device of claim 1, wherein the control unit is further configured to print the image data only after the document is removed from the document table.

3. The document processing device of claim 1, wherein the notification warning is an audible warning.

4. The document processing device according to claim 1, wherein, the control unit is further configured to cause the notification warning to be made by the notification unit after the image data is provided by the scanner.

5. The document processing device of claim 1, wherein the scanner includes:
a light source configured to provide light to the document on the document table;
a mirror configured to guide light reflected by the document;
a charge coupled device (CCD) image sensor configured to receive reflected light from the mirror; and a carriage configured to move at least one of the light source, the mirror, or the CCD image sensor.

6. The document processing device of claim 1, wherein the document table comprises a glass material.

7. The document processing device of claim 1, wherein the sensor unit is configured to detect the presence of the document after processing of the image data of the document for output is completed.

8. The document processing device of claim 1, wherein the sensor unit is configured to detect the size of the document.

9. A data processing device comprising:
a connector to which a storage medium storing image data can be attached;
an input unit configured to receive an authentication input from a user confirming acceptance of the image data;
a display configured to display the image data from the storage medium;
a print unit configured to print the image data on a sheet; and
a control unit connected to the connector, the input unit, the display, and the print unit, and configured to:
cause the print unit to print the image data on the sheet,
cause a notification unit to provide a notification warning indicating that the storage medium remains attached to the connector, wherein
in a first operation mode, the control unit causes the print unit to print the image data on the sheet without receiving the authentication input, and
in a second operation mode, the control unit causes:
the image data not be displayed on the display before the notification warning is made, if an instruction to display the image data from the user is not received,
the image data to be displayed on the display before the notification warning is made, if the instruction to display the image data from the user is received, and
the notification unit to provide the notification warning after the authentication input has been received, and then the control unit causes the print unit to print the image data on the sheet.

10. The data processing device of claim 9, wherein the control unit is further configured to process the image data only after the storage medium is detached from the connector.

11. A document processing device, comprising:
a scanner configured to read a document on a document table and provide image data of the document;
a display configured to display the image data of the document;
an input unit configured to receive an authentication input from a user confirming acceptance of the image data;
a sensor unit comprising at least one sensor disposed adjacent the document table and configured to detect the document on the document table;
a print unit configured to print the image data of the document on a sheet; and
a processing unit connected to the scanner, the display, the input unit, the sensor unit, and the print unit, and configured to:
cause the print unit to print the image data on the sheet, and
cause a notification unit to provide a notification warning indicating that the document remains on the document table, wherein
in a first operation mode, the processing unit causes the print unit to print the image data on the sheet without receiving the authentication input, and
in a second operation mode, the processing unit causes:
the image data not be displayed on the display before the notification warning is made, if an instruction to display the image data from the user is not received,
the image data to be displayed on the display before the notification warning is made, if the instruction to display the image data from the user is received, and
the notification unit to provide the notification warning after the authentication input has been received, and then the processing unit causes the print unit to print the image data on the sheet.

12. The document processing device of claim 11, wherein the document table comprises a glass material.

13. The document processing device of claim 11, wherein the sensor unit further comprises a first sensor, a second sensor, a third sensor, and a fourth sensor, wherein each sensor is disposed adjacent the document table.

14. The document processing device of claim 13, wherein the first sensor, the second sensor, the third sensor, and the fourth sensor are each disposed at positions different from each other and on a first surface of the document table opposite a second surface of the document table on which the document is disposed.

15. The document processing device of claim 11, wherein the at least one sensor is an optical sensor.

16. The document processing device of claim 11, wherein the at least one sensor is configured to detect the presence of the document after processing of the image data of the document for output is completed.

17. The document processing device of claim 11, wherein the at least one sensor is configured to detect the size of the document.

18. The document processing device of claim 11, wherein the processing unit is further configured to print the image data only after the document is removed from the document table.

19. The document processing device of claim 11, wherein the notification warning is an audible warning.

20. The document processing device of claim 11, wherein the processing unit is further configured to cause the notification warning to be made by the notification unit after the image data is provided by the scanner.

* * * * *